(12) United States Patent
Nadimpalli et al.

(10) Patent No.: US 11,361,491 B2
(45) Date of Patent: Jun. 14, 2022

(54) SYSTEM AND METHOD OF GENERATING FACIAL EXPRESSION OF A USER FOR VIRTUAL ENVIRONMENT

(71) Applicant: Wipro Limited, Bangalore (IN)

(72) Inventors: Vivek Kumar Varma Nadimpalli, Hyderabad (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 61 days.

(21) Appl. No.: 17/011,128

(22) Filed: Sep. 3, 2020

(65) Prior Publication Data
US 2022/0005246 A1 Jan. 6, 2022

(30) Foreign Application Priority Data
Jul. 3, 2020 (IN) .............................. 202041028402

(51) Int. Cl.
*G06T 13/00* (2011.01)
*G10L 15/02* (2006.01)
*G10L 25/90* (2013.01)
*G06K 9/62* (2022.01)
*G06V 40/16* (2022.01)

(52) U.S. Cl.
CPC ............ *G06T 13/00* (2013.01); *G06K 9/6262* (2013.01); *G06V 40/171* (2022.01); *G10L 15/02* (2013.01); *G10L 25/90* (2013.01); *G10L 2015/025* (2013.01)

(58) Field of Classification Search
CPC .... G06T 13/00; G06V 40/171; G06K 9/6262; G10L 15/02; G10L 25/90; G10L 2015/025
See application file for complete search history.

(56) References Cited

U.S. PATENT DOCUMENTS

| | | | |
|---|---|---|---|
| 8,224,652 B2 | 7/2012 | Wang et al. | |
| 9,589,357 B2 | 3/2017 | Li et al. | |
| 2011/0131041 A1* | 6/2011 | Cortez | G10L 15/16 704/235 |
| 2018/0144746 A1* | 5/2018 | Mishra | B60R 16/0373 |
| 2020/0051565 A1* | 2/2020 | Singh | G10L 15/22 |

FOREIGN PATENT DOCUMENTS

CN 110135226 A 8/2019

* cited by examiner

*Primary Examiner* — Xin Sheng
(74) *Attorney, Agent, or Firm* — Finnegan, Henderson, Farabow, Garrett & Dunner, LLP

(57) ABSTRACT

The present invention relates to a method of generating a facial expression of a user for a virtual environment. The method comprises obtaining a video and an associated speech of the user. Further, extracting in real-time at least one of one or more voice features and one or more text features based on the speech. Furthermore, identifying one or more phonemes in the speech. Thereafter, determining one or more facial features relating to the speech of the user using a pre-trained second learning model based on the one or more voice features, the one or more phonemes, the video and one or more previously generated facial features of the user. Finally, generating the facial expression of the user corresponding to the speech for an avatar representing the user in the virtual environment.

20 Claims, 8 Drawing Sheets

US 11,361,491 B2

SYSTEM AND METHOD OF GENERATING FACIAL EXPRESSION OF A USER FOR VIRTUAL ENVIRONMENT

TECHNICAL FIELD

The present disclosure relates to the field of augmented reality and virtual reality. Particularly, but not exclusively, the present disclosure relates to a method of generating a facial expression of a user for various applications in a virtual environment.

BACKGROUND

In recent times, the trend of online training sessions is increasing. The online training sessions pose a problem regarding the availability of the trainer and the trainees at the same time. However, pre-recorded digital sessions may be used as an alternative to the online training sessions, but the pre-recorded digital sessions lack the immersive experience to the trainees or viewers. Therefore, online training sessions using avatars based on virtual reality and/or augmented reality techniques are used. The avatars are virtual characters used to facilitate natural and interactive human-machine communication. The avatar's appearance can be anthropomorphic (i.e., human characteristics) or cartoon-like, in a 2-D or 3-D form. Mimicking realistic emotions of the trainer by the avatars through its facial motions and body gestures enhances the user experience and provides immersive virtual interaction between the viewers and the trainer.

The existing techniques scan the facial movements and expressions of the trainer during the training session and port the facial movements and expressions to the avatar either manually or through an automated process. However, the facial movements and expressions ported to the avatar is specific to the scanned training session and cannot be used for other training sessions of the trainer. Thus, facial movement and expressions of an avatar of a session is not compatible with another session of the avatar. Additionally, porting the facial movements and expressions to the avatar is not dynamic The information disclosed in this background of the disclosure section is only for enhancement of understanding of the general background of the invention and should not be taken as an acknowledgement or any form of suggestion that this information forms the prior art already known to a person skilled in the art.

SUMMARY

Embodiments and aspects of the disclosure are described in detail herein and are considered a part of the claimed disclosure.

Disclosed herein is a method of generating a facial expression of a user for a virtual environment. The method comprises obtaining a video and an associated speech of the user. Further, the method comprises extracting in real-time at least one of one or more voice features and one or more text features based on the speech of the user. Furthermore, the method comprises identifying in real-time one or more phonemes in the speech using a pre-trained first learning model based on at least one of the one or more voice features and the one or more text features. Thereafter, the method comprises determining in real-time one or more facial features relating to the speech of the user using a pre-trained second learning model based on the one or more voice features, the one or more phonemes, the video and one or more previously generated facial features of the user. Finally, the method comprises generating in real-time the facial expression of the user corresponding to the speech for an avatar representing the user in the virtual environment based on the one or more facial features.

Embodiments of the present disclosure discloses a computing system, for generating a facial expression of a user for a virtual environment. The computing system includes a processor and a memory communicatively coupled to the processor, where the memory stores the processor executable instructions, which, on execution, causes the processor to obtain a video and an associated speech of the user. Further, the instructions cause the processor to extract in real-time at least one of one or more voice features and one or more text features based on the speech of the user. Furthermore, the instructions cause the processor to identify in real-time one or more phonemes in the speech using a pre-trained first learning model based on at least one of the one or more voice features and the one or more text features. Thereafter, the instructions cause the processor to determine in real-time one or more facial features relating to the speech of the user using a pre-trained second learning model based on the one or more voice features, the one or more phonemes, the video and one or more previously generated facial features of the user. Finally, the instructions cause the processor to generate in real-time the facial expression of the user corresponding to the speech for an avatar representing the user in the virtual environment based on the one or more facial features.

Embodiments of the present disclosure discloses a non-transitory computer readable medium including instructions stored thereon that when processed by at least one processor cause a device to perform operations comprising obtaining a video and an associated speech of the user. Further, extracting in real-time at least one of one or more voice features and one or more text features based on the speech of the user. Furthermore, identifying in real-time one or more phonemes in the speech using a pre-trained first learning model based on at least one of the one or more voice features and the one or more text features. Thereafter, determining in real-time one or more facial features relating to the speech of the user using a pre-trained second learning model based on the one or more voice features, the one or more phonemes, the video and one or more previously generated facial features of the user. Finally, generating in real-time the facial expression of the user corresponding to the speech for an avatar representing the user in the virtual environment based on the one or more facial features.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
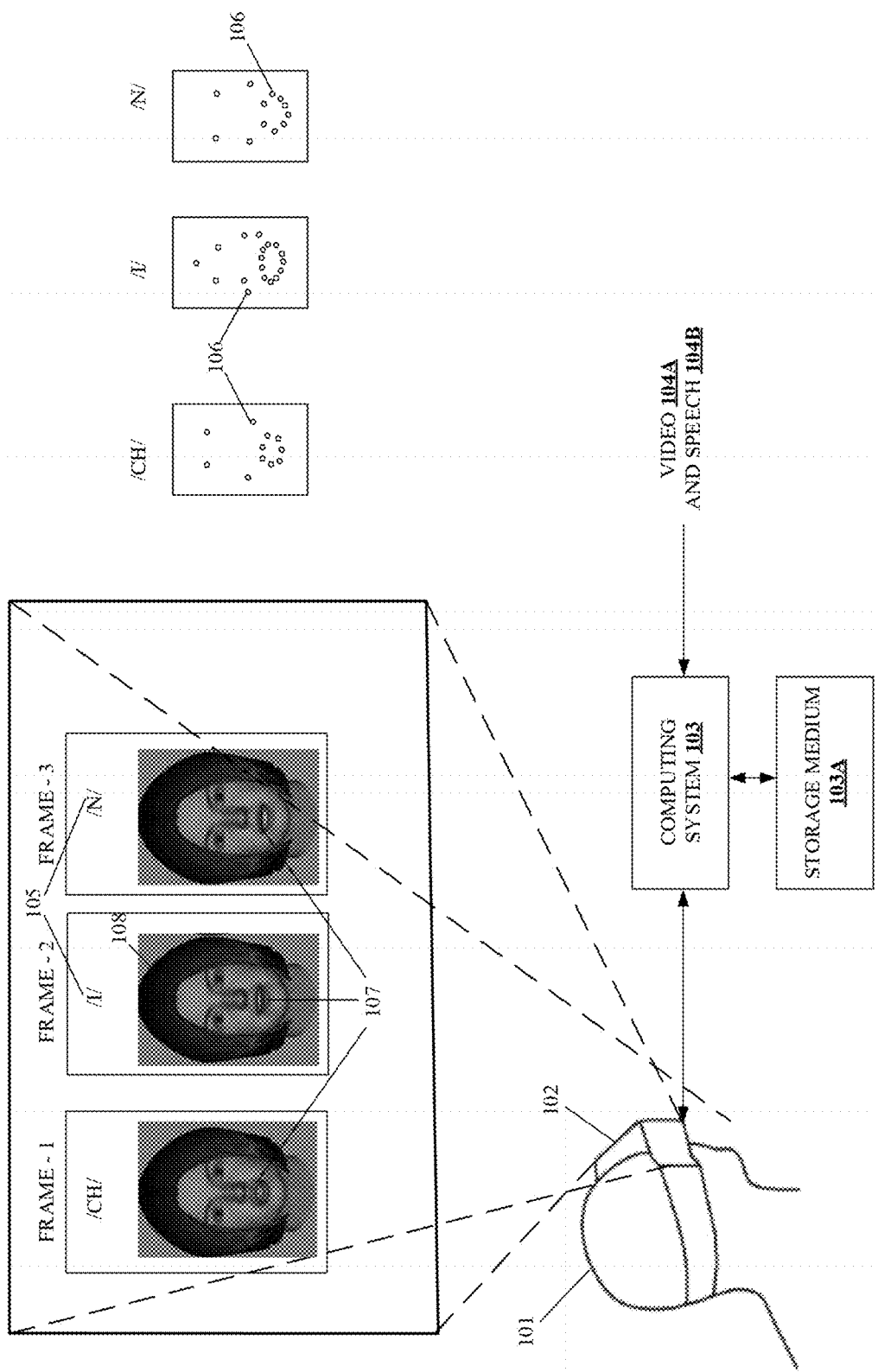
FIG. 1 shows an exemplary environment for generating a facial expression of a user for a virtual environment, in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for generating a facial expression of a user for a virtual environment, in accordance with some embodiments of the present disclosure.

In an embodiment, a computing system (103) may be used to generate a facial expression (107) of a user for a virtual environment. The virtual environment is generated using virtual reality and augmented reality techniques. The Virtual Reality (VR) technique is a simulated experience similar to or completely different from the real world. The Augmented Reality (AR) technique is an interactive experience of a real-world environment where the objects of the real world are enhanced by computer-generated perceptual information and provided to a viewer (101). The computing system (103) may be implemented in a server (not shown in the figure), a smartphone (not shown in the figure), a tablet computer (not shown in the figure), a desktop computer (not shown in the figure), a VR/AR based device (102) and the like. The computing system (103) may obtain a video (104A) and an associated speech (104B) of the user for generating the facial expression (107). The video (104A) and the associated speech (104B) may be real-time multimedia or a pre-recorded multimedia stored in a storage medium (103A) associated with the computing system (103). Herein the present disclosure the phrase "associated speech (104B)" and the word "speech (104B)" is used interchangeably. In one embodiment, the computing system (103) may receive the video (104A) and the associated speech (104B) from a video (104A) capturing device and an audio capturing device respectively. The video (104A) capturing device may be a standalone camera, an infrared camera, and the like. The audio capturing device may be a microphone. In another embodiment, the computing system (103) may retrieve the video (104A) and the associated speech (104B) from the storage medium (103A). The storage medium (103A) may be at least one of a compact disc, database, hard disk, Universal Serial Bus (USB) based storage device, and the like. The storage medium (103A) may be housed inside the computing system (103). In another embodiment, the storage medium (103A) may be external to the computing system (103) as shown in FIG. 1. In yet another embodiment, the computing system (103) may receive the video (104A) and the associated speech (104B) from the server. The user may be a speaker in the video (104A).

In one implementation, the computing system (103) may extract in real-time at least one of one or more voice features and one or more text features based on the speech (104B) of the user. The one or more voice features are indicative of a unique tone, pitch, modulation associated with the speech (104B) of the user. The one or more text features are indicative of one or more lexical units in the speech (104B) of the user and one or more synonyms associated with the one or more lexical units. For example, the one or more lexical units in the speech (104B) of the user is "CHIN" as shown in FIG. 1. Further, the computing system (103) may identify in real-time one or more phonemes (105) in the speech (104B) using a pre-trained first learning model based on at least one of the one or more voice features and the one or more text features. The one or more phonemes (105) are indicative of the smallest unit of sound used to pronounce a word or a phrase. For example, the sound of the alphabet "m" in speech (104B) is a phoneme and is denoted as "/m/". The pre-trained first learning model is based on a sequential neural network. For example, the one or more phonemes (105) identified in the speech (104B) of the user is "/CH/", "/I/" and "/N/" as shown in FIG. 1.

Further, in an embodiment, the computing system (103) determines in real-time one or more facial features (106) relating to the speech (104B) of the user using a pre-trained second learning model based on the one or more voice features, the one or more phonemes (105), the video (104A) and one or more previously generated facial features (106) of the user. For example, the pre-trained second learning model is a generative adversarial network. The one or more facial features (106) are indicative of key points on a face of the user in the video (104A). The key points indicate the change in one or more portion of the face corresponding to the speech (104B) produced by the user. For example, the one or more facial features (106) may indicate an increase in the length of the lips of the user during the pronunciation of one or more phonemes (105) such as "/e/". The one or more previously generated facial features (106) indicate the one or more facial features (106) generated by the pre-trained second neural network corresponding to a previous input (i.e. previously extracted one or more voice features, previously identified one or more phonemes (105), and the like).

Furthermore, in an embodiment, the computing system (103) generates in real-time the facial expression (107) of the user corresponding to the speech (104B) for an avatar (108) representing the user in the virtual environment based on the one or more facial features (106). The facial expression (107) is generated using a unity based virtual reality editor. The computing system (103) provides the generated facial expression (107) for the avatar (108) and the speech (104B) of the user to the viewer (101) via the VR/AR device (102) as shown in FIG. 1.

Figure 2:
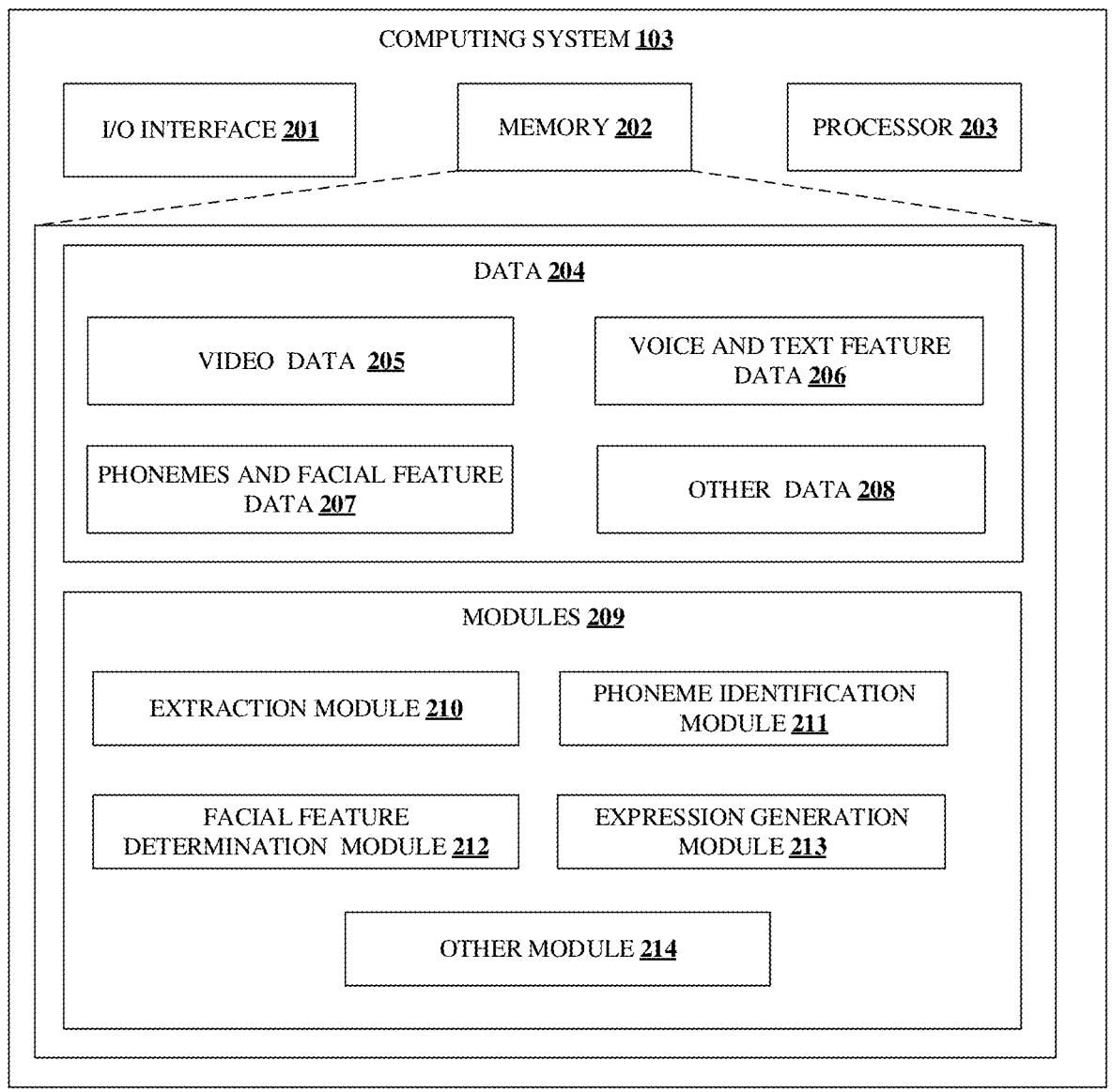
FIG. 2 shows a detailed block diagram of a computing system, in accordance with some embodiments of the present disclosure.

FIG. 2 shows a detailed block diagram of the computing system (103) for generating the facial expression (107) of the user for the virtual environment, in accordance with some embodiments of the present disclosure.

The computing system (103) may include a Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The computing system (103) further includes an Input/Output (I/O) interface (201). The I/O interface (201) may be coupled with the processor (203) through which an input signal or/and an output signal may be communicated. In one embodiment, the video (104A) and the associated speech (104B) of the user may be received through the I/O interface (201). The memory (202) and the storage medium (103A) may be used interchangeably in the disclosure herein.

In some implementations, the computing system (103) may include data (204) and modules (209). As an example, the data (204) and modules (209) may be stored in the memory (202) configured in the computing system (103). In one embodiment, the data (204) may include, for example, a video data (205), a voice and text feature data (206), a phonemes and facial feature data (207), and other data (208). In the illustrated FIG. 2, data (204) are described herein in detail.

In an embodiment, the video data (205) may include the video (104A) and the associated speech (104B) of the user. The video data (205) may include the real-time multimedia or the pre-recorded multimedia.

In an embodiment, the voice and text feature data (206) may include the one or more voice features including at least one of a pitch, an energy associated with the speech (104B) of the user, an entropy associated with the energy, a spectral centroid, a spectral spread, a spectral entropy, a spectral flux, a spectral roll-off, a chroma vector, a chroma deviation associated with the speech (104B) of the user and the like. The person skilled in the art appreciates the user of one or more voice features used in the field of speech recognition, speech generation, and speech enhancement. Further, the voice and text feature data (206) may include the one or more text features including at least one of a bigram, a trigram, and a n-gram associated with a text corresponding to the speech (104B) of the user and one or more synonyms associated with the bigram, the trigram, and the n-gram.

In an embodiment, the phonemes and facial feature data (207) may include the one or more phonemes (105) identified from the speech (104B) of the user. The one or more phonemes (105) indicate the smallest unit of sound used by the user to pronounce the word or the phrase. For example, the sound produced by the user to pronounce an alphabet "F" in the work "First" is the one or more phonemes (105) produced by the user and the one or more phonemes (105) are denoted as "/F/". Further, the phonemes and facial feature data (207) may include the one or more facial features (106) indicative of key points on the face of the user in the video (104A). The key points include at least one of the areas of the face such as forehead, eyes, ears, nose, mouth, cheeks, chin, lips, eyebrows, and the like. The key points denote the variation in the at least one of the areas of the face during the pronunciation of the one or more phonemes (105).

In an embodiment, the other data (208) may include at least one of the pre-trained first learning model for identifying the one or more phonemes (105), the pre-trained second learning model for determining the one or more facial features (106), a pre-trained third learning model for extracting the one or more voice features and the one or more text features, the facial expression (107) generated for the avatar (108), and the like.

In some embodiments, the data (204) may be stored in the memory (202) in the form of various data structures. Additionally, the data (204) may be organized using data models, such as relational or hierarchical data models. The other data (208) may store data, including temporary data and temporary files, generated by the modules (209) for performing the various functions of the computing system (103).

In some embodiments, the data (204) stored in the memory (202) may be processed by the modules (209) communicatively coupled to the processor (203) of the computing system (103). The modules (209) may be stored within the memory (202) as shown in FIG. 2. In one embodiment, the modules (209) may be present outside the memory (202) and implemented as hardware. As used herein, the term modules (209) may refer to an Application Specific Integrated Circuit (ASIC), an FPGA (Field Programmable Gate Array), an electronic circuit, a processor (shared, dedicated, or group) that execute one or more software or firmware programs, a combinational logic circuit, and/or other suitable components that provide the described functionality.

In one implementation, the modules (209) may include, for example, an extraction module (210), a phoneme identification module (211), a facial feature determination module (212), an expression generation module (213) and other module (214). It may be appreciated that such aforementioned modules (209) may be represented as a single module or a combination of different modules.

In an embodiment, the extraction module (210) may be used to extract in real-time at least one of the one or more voice features and the one or more text features based on the speech (104B) of the user. Further, the extraction module (210) may obtain at least one of the one or more voice features and the one or more text features from a pre-trained third learning model based on the speech (104B) of the user, wherein the pre-trained third learning model is based on a sequential neural network.

In an embodiment, the phoneme identification module (211) may be used to identify in real-time the one or more phonemes (105) in the speech (104B). Further, the phoneme identification module (211) may provide the at least one of the one or more voice features and the one or more text features as an input to the pre-trained first learning model. The pre-trained first learning model is based on a sequential neural network. Furthermore, the phoneme identification module (211) may identify a vector embedding of the one or more phonemes (105) in the speech (104B) based on an output of the pre-trained first learning model.

In an embodiment, the facial feature determination module (212) may be used to provide the one or more voice features, the one or more phonemes (105), the video (104A) and one or more previously generated facial features (106) of the user as an input to the pre-trained second learning model to determine the one or more facial features (106) relating to the speech (104B) of the user based on the output of the pre-trained second learning model. Further, the facial feature determination module (212) may be used to train the second learning model such as a generative adversarial network including a generator network and a discriminator network by providing the one or more voice features and the one or more phonemes (105) as an input to a generator network. Furthermore, providing an output of the generator network and an image with one or more facial features (106) extracted from the video (104A) as the input to the discriminator network, wherein the output of the generator network is indicative of the one or more facial features (106). Thereafter, updating one or more weights associated with the discriminator network and the generator network using a backpropagation technique based on the output of the discriminator network.

In an embodiment, the expression generation module (213) may be used to generate in real-time the facial expression (107) of the user by determining the facial expression (107) corresponding to the speech (104B) of the user based on the one or more facial features (106) using a unity based virtual reality editor. The person skilled in the art appreciates the use of one or more virtual reality editors for generating the facial expression (107).

In an embodiment, the other module (214) may be used to receive the video (104A) and the associated speech (104B) from the video (104A) capturing device and the audio capturing device respectively. Further, the other module (214) may retrieve the video (104A) and the associated speech (104B) from a storage medium (103A). Furthermore, the other module (214) may receive the video (104A) and the associated speech (104B) from a server.

Figure 3:
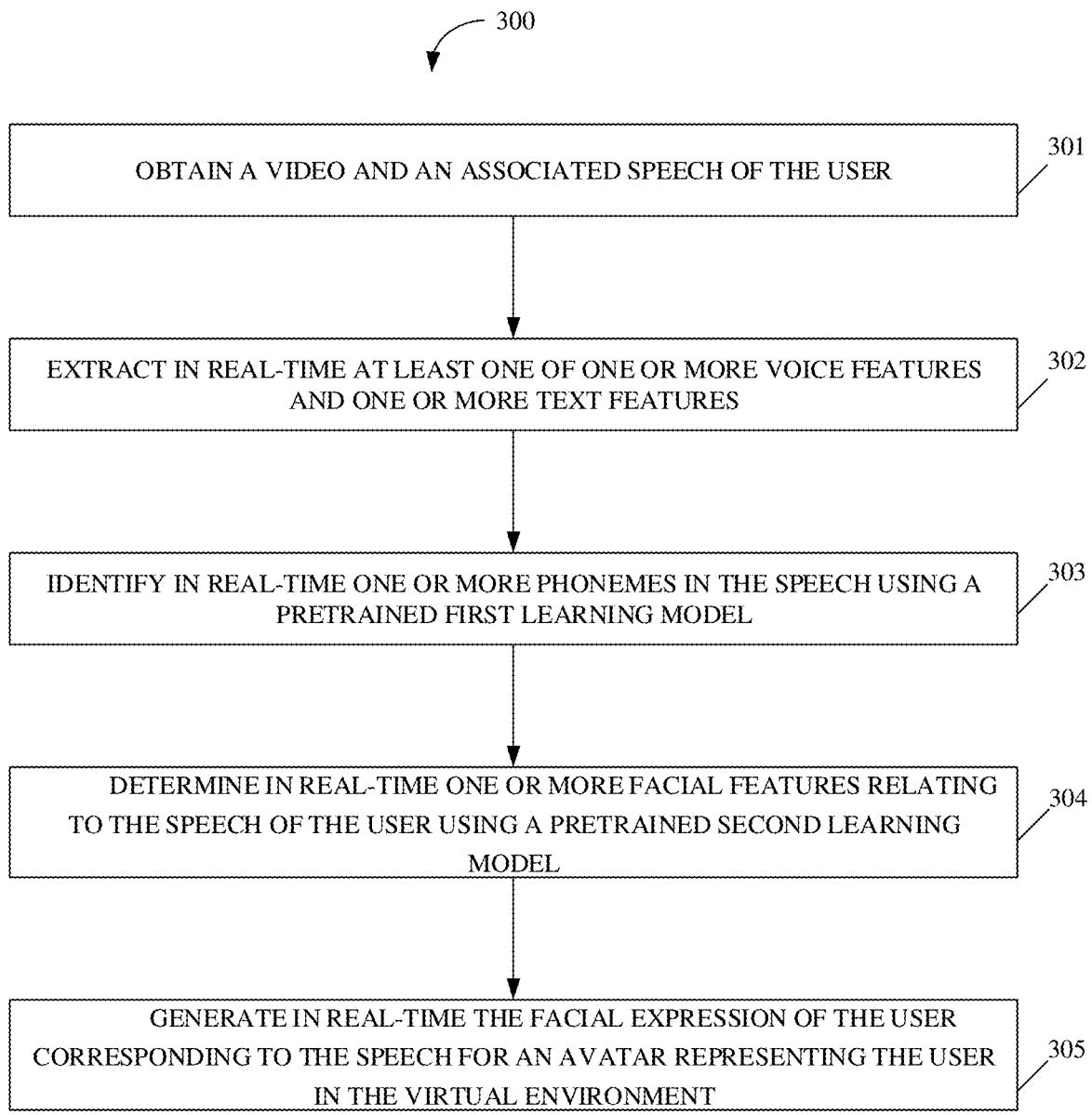
FIG. 3 shows a flowchart illustrating method steps for generating a facial expression of a user for a virtual environment, in accordance with some embodiment of the present disclosure.

FIG. 3 shows a flowchart illustrating method steps for generating a facial expression (107) of a user for a virtual environment, in accordance with some embodiment of the present disclosure.

The order in which the method 300 may be described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At the step 301, the computing system (103) obtains the video (104A) and the speech (104B) associated with the video (104A) (interchangeably referred as associated speech (104B)) of the user.

In an embodiment, the video (104A) and the associated speech (104B) may be the real-time multimedia or the pre-recorded multimedia. For example, the video (104A) and the speech (104B) may include a live news feed, a pre-recorded or a live training session and the like. In one embodiment, the video (104A) and the associated speech (104B) may be received from the video (104A) capturing device such as the infrared camera, the color image capturing camera and the like, and the audio capturing device such as the microphone respectively. In another embodiment, the video (104A) and the associated speech (104B) may be retrieved from the storage medium (103A) associated with the computing system (103). In yet another embodiment, the video (104A) and the associated speech (104B) may be received from the server.

At the step 302, the computing system (103) may extract in real-time at least one of one or more voice features and one or more text features based on the speech (104B) of the user.

Figure 4A:
FIG. 4A shows an exemplary extraction of one or more voice features and one or more text features using a pre-trained third learning model, in accordance with some embodiments of the present disclosure.

In an embodiment, the computing system (103) may extract in real-time at least one of the one or more voice features (402A) and the one or more text features (402B) by obtaining at least one of the one or more voice features (402A) and the one or more text features (402B) from the pre-trained third learning model (401) based on the speech (104B) of the user as shown in FIG. 4A. The pre-trained third learning model (401) is based on the sequential neural network. The sequential neural network is trained using a deep learning technique.

In an embodiment, the one or more voice features (402A) may include at least one of the pitch, the energy associated with the speech (104B) of the user, the entropy associated with the energy, the spectral centroid, the spectral spread, a zero crossing rate, a Mel-frequency cepstral coefficients, the spectral entropy, the spectral flux, the spectral roll-off, the chroma vector, and the chroma deviation associated with the speech (104B) of the user. The person skilled in the art appreciates the user of one or more voice features (402A) from the field of speech (104B) recognition, speech (104B) enhancement and speech (104B) generation for extracting the one or more voice features (402A). For example, the pitch is indicative of subjective perception of a sound wave, the zero-crossing rate is a measure of number of times in a given time interval/frame the amplitude of the speech (104B) signals passes through a value of zero, the energy of the speech (104B) signal provides a convenient representation that reflects the amplitude variation, the spectral entropy may be used to detect silence and voiced region of speech (104B) and the like.

In an embodiment, the one or more text features (402B) may include at least one of the bigram, the trigram, and the n-gram associated with the text corresponding to the speech (104B) of the user and one or more synonyms associated with the bigram, the trigram, and the n-gram. In an embodiment, the text corresponding to the speech (104B) of the user may be obtained using the pre-trained third learning model (401). In another embodiment, the text corresponding to the speech (104B) of the user may be obtained using one or more speech (104B) recognition techniques. The text corresponds to the one or more words and one or more phrases spoken by the user in the speech (104B). For example, the text may be "Good Morning, Welcome to training session". Further, the bigram indicates a sequence of two adjacent elements from a string such as letters, syllables, or words in the text. For example, the bigram may be "Go" from the text "Good", "Good Morning" from the text "Good Morning, Welcome to training session" and the like. Similarly, the trigram indicates the sequence of two adjacent elements from a string such as letters, syllables, or words in the text and the n-gram indicates the sequence of two adjacent elements from a string such as letters, syllables, or words in the text. The value of the n may be an integer value, for example 1, 2, 3, 4, 5, 6 and the like. Furthermore, the one or more synonyms associated with the bigram, the trigram, and the n-gram may be obtained using a Global Vectors (Glove) for word representation technique. The Glove is based on an unsupervised learning model for obtaining vector representations for words. For example, the words (i.e. the bigram, the trigram, the n-gram, the one or more synonyms) are represented using vectors of dimension 1×300 such as word1=[0.356557, −0.348621, . . . , −0.569231]$_{1×300}$.

Referring back to FIG. 3, at the step 303, the computing system (103) may identify in real-time the one or more phonemes (105) in the speech (104B) using the pre-trained first learning model based on at least one of the one or more voice features (402A) and the one or more text features (402B).

Figure 4B:
FIG. 4B shows an exemplary identification of one or more phonemes using the first learning model, in accordance with some embodiments of the present disclosure.

In an embodiment, the computing system (103) may identify in real-time the one or more phonemes (105) in the speech (104B) by providing the at least one of the one or more voice features (402A) and the one or more text features (402B) as the input to the pre-trained first learning model (403) as shown in FIG. 4B. The pre-trained first learning model (403) is based on the sequential neural network. The sequential neural network may be trained using the deep learning techniques such as long-short term memory, bidirectional long short-term memory and the like. Further, identifying a vector embedding of the one or more phonemes (105) in the speech (104B) based on an output of the pre-trained first learning model (403). The vector embedding is based on one-hot representation of size 32, 64, 128, 256 and the like. For example, the one or more phonemes (105) such as "/CH/", "/G/", "/AY/", "/TH/", "/DH/", "/N/", "/K/", "/EY/", "/S/", "/V/", "/P/", "/D/", "/Z/", "/K/", "/T/", "/W/", "/B/", "/G/", "/M/", and the like are represented using the vector embedding.

Referring back to FIG. 3, at the step 304, the computing system (103) may determine in real-time the one or more facial features (106) relating to the speech (104B) of the user using a pre-trained second learning model based on the one or more voice features (402A), the one or more phonemes (105), the video (104A) and one or more previously generated facial features (106) of the user.

In an embodiment, the one or more facial features (106) are indicative of key points on a face of the user in the video (104A). The key points include at least one of the areas of the face including the forehead, the eyes, the ears, the nose, the mouth, the cheeks, the chin, the eyebrows, the lips and the like. Further, the one or more facial features (106) indicate a variation in the at least one of the areas of the face corresponding to the speech (104B).

Figure 4C:
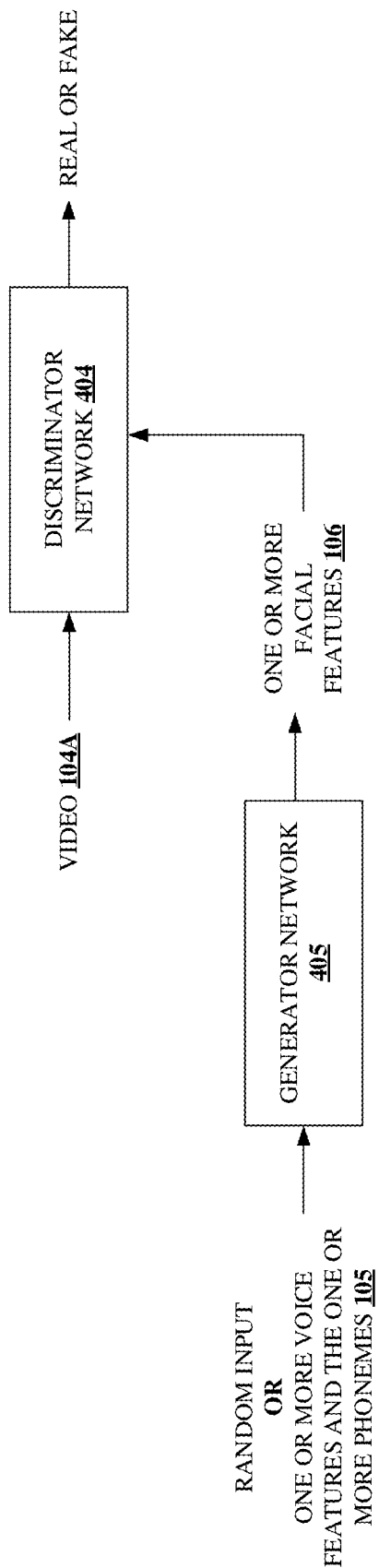
FIG. 4C shows an exemplary training of the second learning model, in accordance with some embodiments of the present disclosure.

In an embodiment, the second learning model may be trained by the computing system (103). In another embodiment, the second learning model may be trained by the sever. The second learning model is the generative adversarial network comprising the generator network (405) and the discriminator network (404) as shown in FIG. 4C. The person skilled in the art appreciates the use of one or more generative and discriminative pair of models such as Naive Bayes and Logistic Regression, linear discriminant analysis and multi-layer perceptron, hidden markov models and conditional random fields and the like. Further, training the second learning model includes providing the one more voice features (402A) the one or more phonemes (105) as the input to the generator network (405) or a random input equivalent to the one more voice features (402A) the one or more phonemes (105) as the input to the generator network (405) as shown in FIG. 4C. The output of the generator network (405) is indicative of the one or more facial features (106). Furthermore, providing the output of the generator network (405) and an image extracted from the video (104A) as the input to the discriminator network (404) as shown in FIG. 4C. The one or more facial features (106) may be represented in the image extracted from the video (104A). The discriminator network (404) may distinguish between the one or more facial features (106) in the image and the one or more facial features (106) predicted by the generator network (405). The output of the discriminator network (404) indicates one of "real" or "fake". The output "real" of the discriminator network (404) indicates the one or more facial features (106) predicted by the generator network (405) is similar to the one or more facial features (106) represented in the image extracted from the video (104A). Alternatively, the output "fake" of the discriminator network (404) indicates the one or more facial features (106) predicted by the generator network (405) is not similar to the one or more facial features (106) represented in the image extracted from the video (104A). Thereafter, updating one or more weights associated with the discriminator network (404) and the generator network (405) using a backpropagation technique based on the output of the discriminator network (404). In an embodiment, the one or more weights associated with the generator network (405) and the discriminator network (404) are updated for alternative inputs. In another embodiment, the one or more weights associated with the generator network (405) is updated for one or more epochs while keeping the one or more weights associated with the discriminator network (404) a constant, and the one or more weights associated with the discriminator network (404) is updated for one or more epochs while keeping the one or more weights associated with the generator network (405) a constant.

Figure 4D:
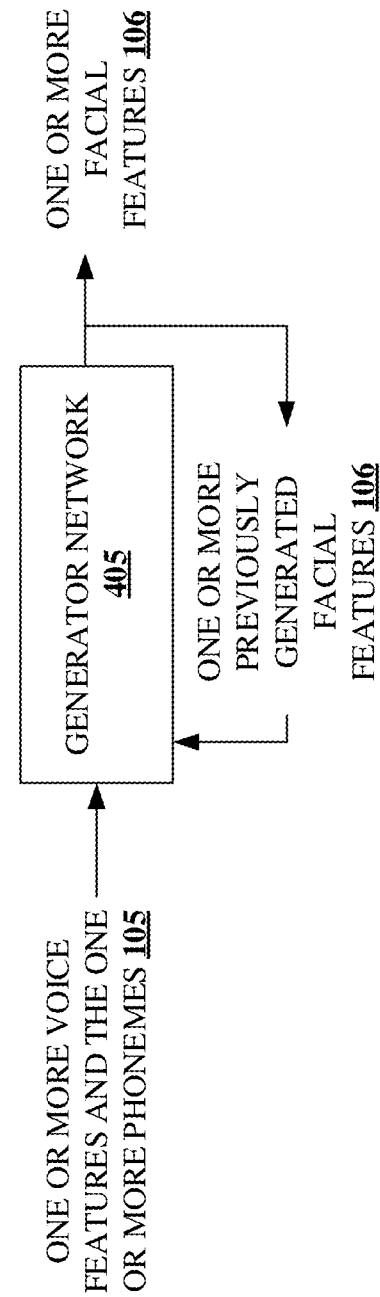
FIG. 4D shows an exemplary generation of one or more facial features corresponding to a speech of a user using the second learning model, in accordance with some embodiments of the present disclosure.
Figure 4E:
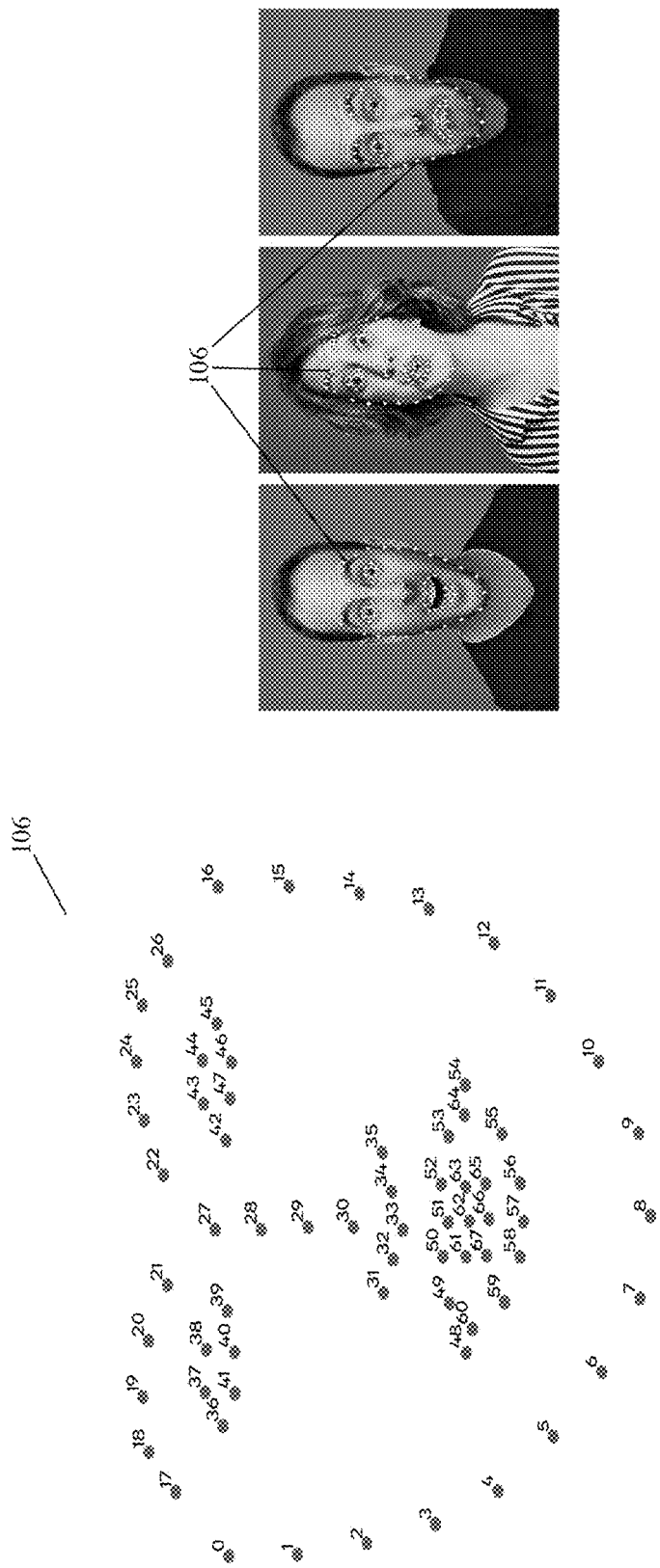
FIG. 4E shows an exemplary one or more facial features, in accordance with some embodiments of the present disclosure.

In an embodiment, after training the second learning model, the generator network (405) is provided with the one or more voice features (402A), the one or more phonemes (105) corresponding to the speech (104B) of the user and the one or more previously generated facial features (106) as the input as shown in FIG. 4D. The generator network (405) predicts the one or more facial features (106) corresponding to the speech (104B) of the user as shown in FIG. 4D. The one or more facial features (106) are indicative of key points on a face of the user is shown in FIG. 4E.

Referring back to FIG. 3, at the step 305, the computing system (103) may generate in real-time the facial expression (107) of the user corresponding to the speech (104B) for an avatar (108) representing the user in the virtual environment based on the one or more facial features (106).

Figure 4F:
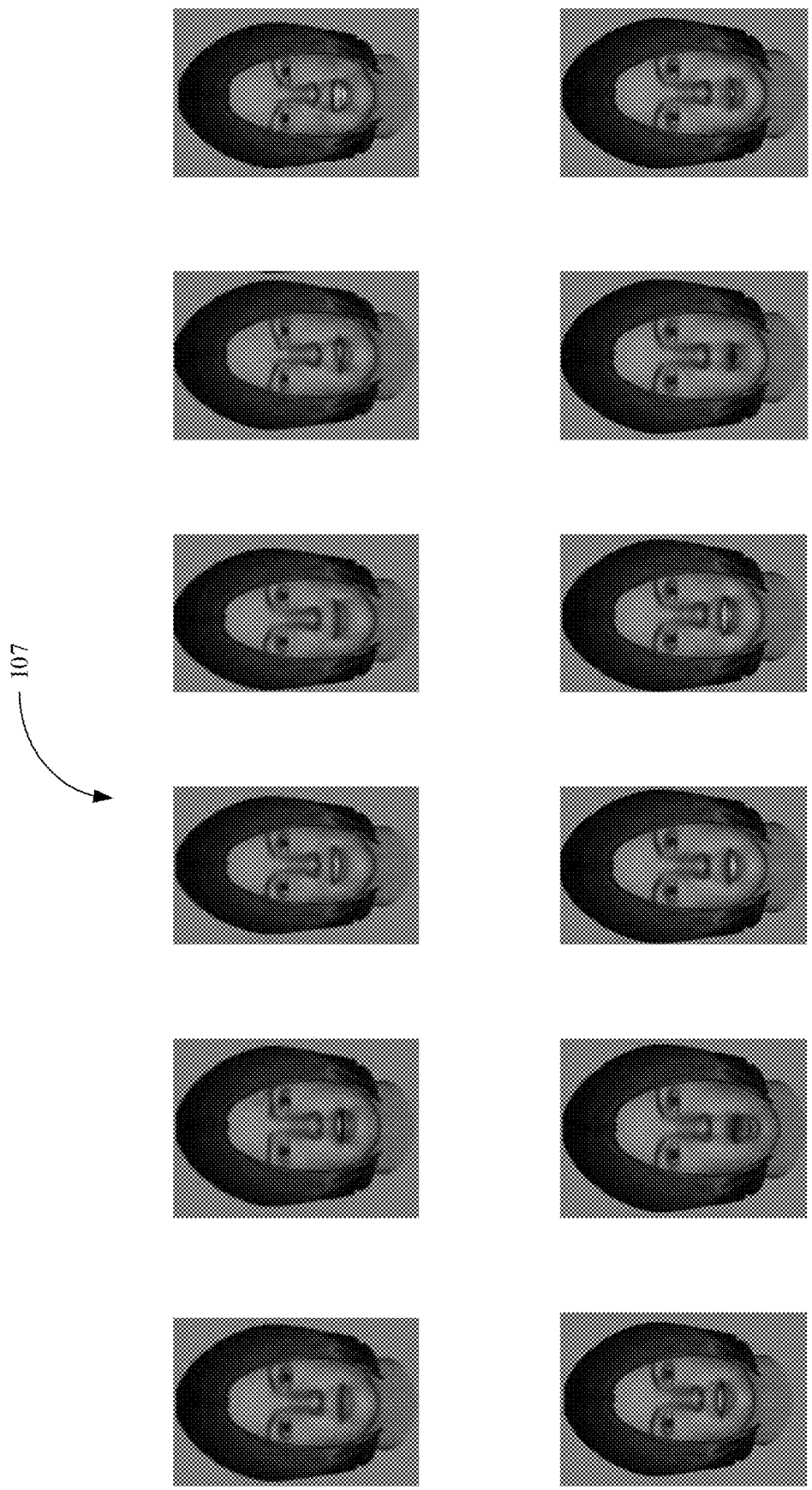
FIG. 4F shows an exemplary generation of facial expression for an avatar in a virtual environment corresponding to speech of a user, in accordance with some embodiments of the present disclosure.

In an embodiment, the computing system (103) may generate in real-time the facial expression (107) of the user by determining the facial expression (107) corresponding to the speech (104B) of the user based on the one or more facial features (106) using a unity based virtual reality editor. The person skilled in the art appreciates the use one or more text to speech (104B) based face synthesis techniques apart from the unity to generate the facial expression (107). Further, the facial expression (107) of the user for the avatar (108) in the virtual environment determined by the computing system (103) from one or more facial features (106) is shown in FIG. 4F. The speech (104B) and the facial expression (107) of the user on the avatar (108) is displayed to the viewer (101) using at least one of a smartphone, VR/AR device (102), a laptop computer, a desktop computer and the like.

The method of generating the facial expression (107) of the user for a virtual environment determines the one or more facial features (106) corresponding to the speech (104B) of the user and generates the avatar (108) with the facial expression (107) similar to the user based on the one or more facial features (106). The second training model predicts the one or more facial features (106) required to generate the facial expression based on the speech (104B) alone without the need for the video (104A). The method of generating the facial expression (107) requires fewer computation resources and less latency as the facial expression (107) is generated based on the speech (104B) alone and the video (104A) is not used to determine the facial features (106). The generation of the facial expression (107) enables virtual conversation with the viewer (101) without the need for training the second learning model for a new speech (104B) associated with the user.

Computer System

Figure 5:
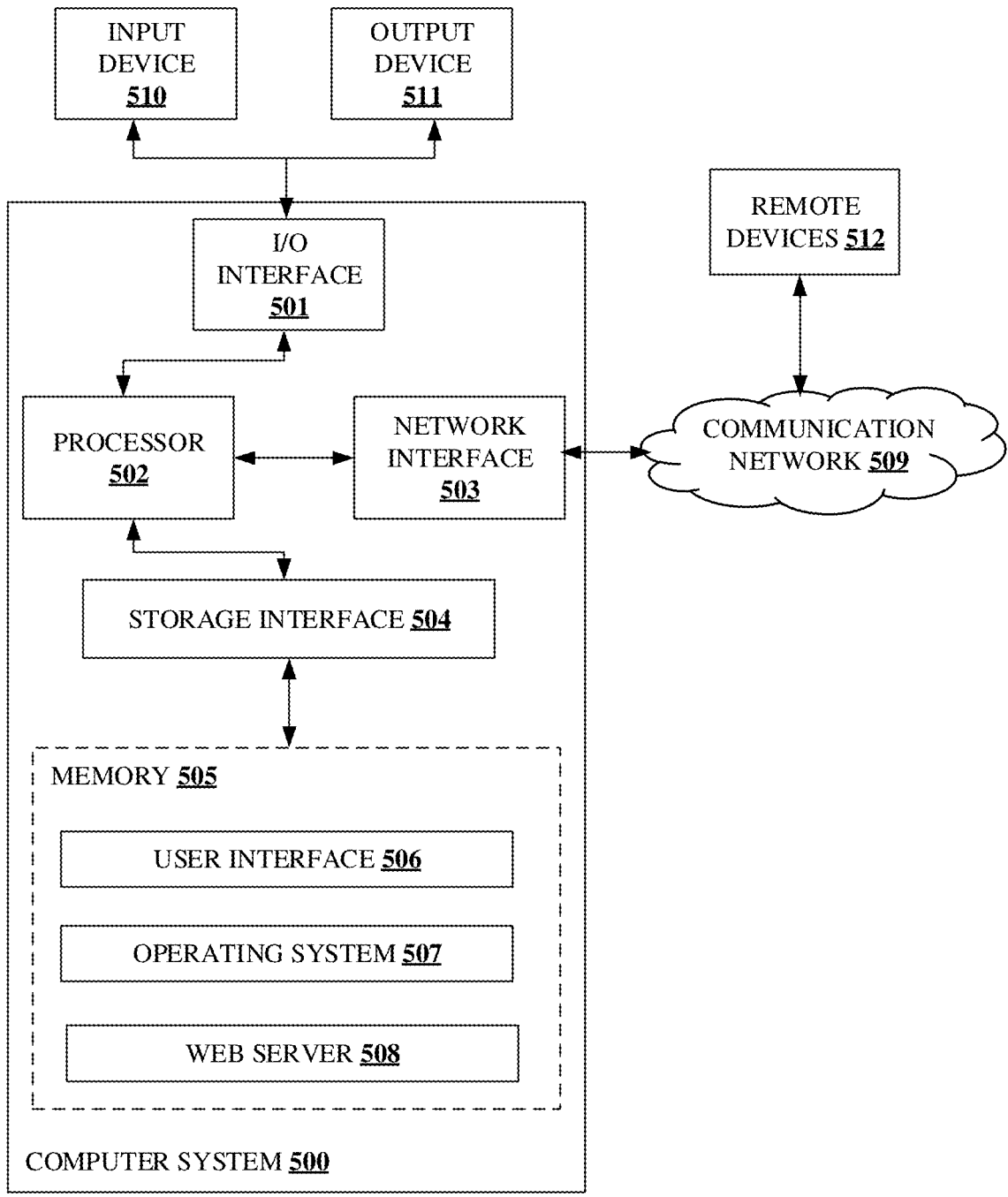
FIG. 5 shows an exemplary computer system for generating a facial expression of a user for a virtual environment, in accordance with some embodiments of the present disclosure.

FIG. 5 illustrates a block diagram of an exemplary computer system (500) for implementing embodiments consistent with the present disclosure. In an embodiment, the computer system (500) may be used to implement the method of generating a facial expression of a user for a virtual environment. The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via I/O interface (501). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface (501), the computer system (500) may communicate with one or more I/O devices. For example, the input device (510) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (509) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (503) and the communication network (509), the computer system (500) may communicate with the one or more service operators.

In some embodiments, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, user interface (506), an operating system (507), web server (508) etc. In some embodiments, computer system (500) may store user/application data (506), such as the data, variables, records, etc. as described in this disclosure. Such databases may be implemented as fault-tolerant, relational, scalable, secure databases such as Oracle or Sybase.

The operating system (507) may facilitate resource management and operation of the computer system (500).

Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (500) may implement a web browser (not shown in the Figure) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (508) may utilize facilities such as AJAX, HTML, ADOBE® FLASH®, JAVASCRIPT®, JAVA®, Application Programming Interfaces (APIs), etc. In some embodiments, the computer system (500) may implement a mail server stored program component not shown in the Figure). The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (500) may implement a mail client stored program component not shown in the Figure). The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium (103A) refers to any type of physical memory on which information or data readable by a processor may be stored. Thus, a computer-readable storage medium (103A) may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital video Disc (DVDs), flash drives, disks, and any other known physical storage media.

In some implementation, the video (104A) and the associated speech (104B) may be received from the remote devices (512). In an embodiment, the remote devices (512) may be the video (104A) capturing device and the audio capturing device.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

| REFERRAL NUMERALS: | |
|---|---|
| Reference number | Description |
| 101 | Viewer |
| 102 | VR/AR device |

-continued

| REFERRAL NUMERALS: | |
|---|---|
| Reference number | Description |
| 103 | Computing System |
| 103A | Storage Medium |
| 104A | Video |
| 104B | Speech |
| 105 | One or more phonemes |
| 106 | One or more facial features |
| 107 | Facial expression |
| 108 | Avatar |
| 201 | I/O interface |
| 202 | Memory |
| 203 | Processor |
| 204 | Data |
| 205 | Video data |
| 206 | Voice and text feature data |
| 207 | Phonemes and facial feature data |
| 208 | Other data |
| 209 | Modules |
| 210 | Extraction module |
| 211 | Phoneme Identification module |
| 212 | Facial feature determination module |
| 213 | Expression generation module |
| 214 | Other module |
| 401 | Third learning model |
| 402A | One or more voice features |
| 402B | One or more text features |
| 403 | First learning model |
| 404 | Discriminator network |
| 405 | Generator network |
| 500 | Computer System |
| 501 | I/O interface |
| 502 | Processor |
| 503 | Network Interface |
| 504 | Storage Interface |
| 505 | Memory |
| 506 | User Interface |
| 507 | Operating System |
| 508 | Web Server |
| 509 | Communication Network |
| 510 | Input Device |
| 511 | Output Device |
| 512 | Remote Devices |

We claim:

1. A method of generating a facial expression of a user for a virtual environment, the method comprises:
   obtaining, by a computing system, a video and an associated speech of the user;
   extracting in real-time, by the computing system, at least one of one or more voice features and one or more text features based on the speech of the user;
   identifying in real-time, by the computing system, one or more phonemes in the speech using a pre-trained first learning model based on at least one of the one or more voice features and the one or more text features;
   determining in real-time, by the computing system, one or more facial features relating to the speech of the user using a pre-trained second learning model based on the one or more voice features, the one or more phonemes, the video and one or more previously generated facial features of the user; and
   generating in real-time, by the computing system, the facial expression of the user corresponding to the speech for an avatar representing the user in the virtual environment based on the one or more facial features.

2. The method as claimed in claim 1, wherein obtaining the video and the associated speech comprises one of:
   receiving the video and the associated speech from a video capturing device and an audio capturing device respectively; or
   retrieving the video and the associated speech from a storage medium; or
   receiving the video and the associated speech from a server.

3. The method as claimed in claim 1, wherein extracting in real-time at least one of the one or more voice features and the one or more text features comprises obtaining at least one of the one or more voice features and the one or more text features from a pre-trained third learning model based on the speech of the user, wherein the pre-trained third learning model is based on a sequential neural network.

4. The method as claimed in claim 1, wherein the one or more voice features comprises at least one of a pitch, an energy associated with the speech of the user, an entropy associated with the energy, a spectral centroid, a spectral spread, a spectral entropy, a spectral flux, a spectral roll-off, a chroma vector, and a chroma deviation associated with the speech of the user.

5. The method as claimed in claim 1, wherein the one or more text features comprises at least one of a bigram, a trigram, and a n-gram associated with a text corresponding to the speech of the user and one or more synonyms associated with the bigram, the trigram, and the n-gram.

6. The method as claimed in claim 1, wherein identifying in real-time the one or more phonemes in the speech comprises:
   providing the at least one of the one or more voice features and the one or more text features as an input to the pre-trained first learning model, wherein the pre-trained first learning model is based on a sequential neural network; and
   identifying a vector embedding of the one or more phonemes in the speech based on an output of the pre-trained first learning model.

7. The method as claimed in claim 1, wherein the one or more facial features are indicative of key points on a face of the user in the video, wherein the key points comprises at least one of areas of the face including forehead, eyes, ears, nose, mouth, cheeks, chin, and lips.

8. The method as claimed in claim 1, wherein training the second learning model comprises:
   providing the one more voice features the one or more phonemes as an input to a generator network, wherein the second learning model is a generative adversarial network comprising the generator network and a discriminator network;
   providing an output of the generator network and an image with one or more facial features extracted from the video as the input to the discriminator network, wherein the output of the generator network is indicative of the one or more facial features; and
   updating one or more weights associated with the discriminator network and the generator network using a backpropagation technique based on the output of the discriminator network.

9. The method as claimed in claim 1, wherein generating in real-time the facial expression of the user comprises determining the facial expression corresponding to the speech of the user based on the one or more facial features using a unity based virtual reality editor.

10. A computing system for generating a facial expression of a user for a virtual environment, the computing system comprises:

a processor; and a memory communicatively coupled to the processor, wherein the memory stores the processor executable instructions, which, on execution, causes the processor to:

obtain a video and an associated speech of the user;

extract in real-time at least one of one or more voice features and one or more text features based on the speech of the user;

identify in real-time one or more phonemes in the speech using a pre-trained first learning model based on at least one of the one or more voice features and the one or more text features;

determine in real-time one or more facial features relating to the speech of the user using a pre-trained second learning model based on the one or more voice features, the one or more phonemes, the video and one or more previously generated facial features of the user; and generate in real-time the facial expression of the user corresponding to the speech for an avatar representing the user in the virtual environment based on the one or more facial features.

11. The computing system as claimed in claim 10, wherein the processor is configured to obtain the video and the associated speech comprises one of:

receiving the video and the associated speech from a video capturing device and an audio capturing device respectively; or retrieving the video and the associated speech from a storage medium; or receiving the video and the associated speech from a server.

12. The computing system as claimed in claim 10, wherein the processor is configured to extract in real-time at least one of the one or more voice features and the one or more text features comprises obtaining at least one of the one or more voice features and the one or more text features from a pre-trained third learning model based on the speech of the user, wherein the pre-trained third learning model is based on a sequential neural network.

13. The computing system as claimed in claim 10, wherein the processor is configured to identify in real-time the one or more phonemes in the speech comprises:

providing the at least one of the one or more voice features and the one or more text features as an input to the pre-trained first learning model, wherein the pre-trained first learning model is based on a sequential neural network; and identifying a vector embedding of the one or more phonemes in the speech based on an output of the pre-trained first learning model.

14. The computing system as claimed in claim 10, wherein the processor is configured to train the second learning model comprises:

providing the one more voice features the one or more phonemes as an input to a generator network, wherein the second learning model is a generative adversarial network comprising the generator network and a discriminator network;

providing an output of the generator network and an image with one or more facial features extracted from the video as the input to the discriminator network, wherein the output of the generator network is indicative of the one or more facial features; and updating one or more weights associated with the discriminator network and the generator network using a backpropagation technique based on the output of the discriminator network.

15. The computing system as claimed in claim 9, wherein the processor is configured to generate in real-time the facial expression of the user comprises determining the facial expression corresponding to the speech of the user based on the one or more facial features using a unity based virtual reality editor.

16. A non-transitory computer readable medium including instructions stored thereon that when processed by at least one processor cause a device to perform operations comprising:

obtaining a video and an associated speech of the user;

extracting in real-time at least one of one or more voice features and one or more text features based on the speech of the user;

identifying in real-time one or more phonemes in the speech using a pre-trained first learning model based on at least one of the one or more voice features and the one or more text features;

determining in real-time one or more facial features relating to the speech of the user using a pre-trained second learning model based on the one or more voice features, the one or more phonemes, the video and one or more previously generated facial features of the user; and generating in real-time the facial expression of the user corresponding to the speech for an avatar representing the user in the virtual environment based on the one or more facial features.

17. The media of claim 16, wherein the instructions causes the at least one processor to obtain the video and the associated speech comprises one of:

receiving the video and the associated speech from a video capturing device and an audio capturing device respectively; or retrieving the video and the associated speech from a storage medium; or receiving the video and the associated speech from a server.

18. The media of claim 16, wherein the instructions causes the at least one processor to extract in real-time at least one of the one or more voice features and the one or more text features comprises obtaining at least one of the one or more voice features and the one or more text features from a pre-trained third learning model based on the speech of the user, wherein the pre-trained third learning model is based on a sequential neural network.

19. The media of claim 16, wherein the instructions causes the at least one processor to identify in real-time the one or more phonemes in the speech comprises:

providing the at least one of the one or more voice features and the one or more text features as an input to the pre-trained first learning model, wherein the pre-trained first learning model is based on a sequential neural network; and identifying a vector embedding of the one or more phonemes in the speech based on an output of the pre-trained first learning model.

20. The media of claim 16, wherein the instructions causes the at least one processor to train the second learning model comprises:

providing the one more voice features the one or more phonemes as an input to a generator network, wherein the second learning model is a generative adversarial network comprising the generator network and a discriminator network;

providing an output of the generator network and an image with one or more facial features extracted from the video as the input to the discriminator network, wherein the output of the generator network is indicative of the one or more facial features; and updating one or more weights associated with the discriminator network and the generator network using a backpropagation technique based on the output of the discriminator network.

\* \* \* \* \*